Patented Jan. 16, 1951

2,537,982

UNITED STATES PATENT OFFICE 2,537,982

ADHESIVE CEMENTING AND COATING COMPOSITION

Alfred L. Finn, Detroit, Mich., assignor to Minnesota Mining & Manufacturing Company, St. Paul, Minn., a corporation of Delaware No Drawing. Application August 3, 1945, Serial No. 608,837

10 Claims. (Cl. 154—43)

This invention relates to self-toughening adhesive cement compositions in stably viscous liquid form, and particularly to such compositions comprising rubbery polymers, such as copolymers of butadiene and acrylonitrile; and to the dried and self-toughened coatings obtained therefrom.

Previously, many cement compositions containing Buna N (rubbery butadiene-acrylonitrile) type polymers have also included vulcanizing agents such as sulfur and accelerators in order to provide for subsequent toughening of the cement coating. Sulfur vulcanization normally requires heating to at least about 220–230° F. For use in operations involving lower temperatures, it has sometimes been possible, by means of suitable ultra-accelerators blended with the sulfur-containing stock just prior to application, to prepare cements the dried films of which would vulcanize even at room temperature. But such cements also vulcanize in solution, and at room temperature soon increase in viscosity to the gelatinous state; they are not stably viscous. Furthermore, sulfur vulcanization was found in these prior art compositions to reduce the expected adhesion of the cement to surfaces to which it was applied; addition of tackifiers in some cases then inhibited subsequent vulcanization or otherwise lessened the degree of oil-resistance and heat-resistance obtainable.

It is therefore an object of this invention to provide a self-toughening adhesive or coating composition, stable in liquid form but which is capable, when applied to a surface and dried by evaporation of solvent, of rapidly providing a tough, adherent, solvent-resistant and heat-resistant coating after brief aging and without the application of heat. A further object is to have present with the Buna-N, or equivalent, an organic material which is inactive with the Buna-N when a volatile organic solvent is present, but which, upon evaporation of such solvent will immediately act upon said Buna-N at temperatures of the order of room temperatures to yield a firm, tough, heat-resistant and/or oil resistant product. Other objects and advantages will appear from the application taken as a whole.

I have found that adhesive cement compositions comprising Buna N type polymer and suitable tackifier, the dried film of which remains substantially soft, thermoplastic and soluble may be rendered capable of forming adherent dried films which are self-toughening, heat-resistant and solvent-resistant by the addition to such adhesive compositions of certain organic acidic materials, particularly when used together with certain reactive basic materials or when added in the form of soluble pre-formed salts thereof, all as hereinafter defined, without substantially diminishing the viscosity stability of the said liquid adhesive cement compositions.

Of the various materials which I may use, zinc oxide and salicylic acid, or pre-formed zinc salicylate, is a preferred example. Magnesium salicylate may also be used as may the zinc or magnesium salts of benzoic acid or of substituted benzoic acids such as ortho-chlorobenzoic acid or ortho-aminobenzoic acid. These salts are found to be soluble in the presence of the Buna N polymer in many of the well known volatile liquid solvents or solvent mixtures commonly used with this class of polymer. They are generally compatible with the polymer, forming clear films therewith. When these materials are mixed with Buna N in the dry state a rapid toughening action, loss of solubility, and reduction in thermoplasticity occurs.

This toughening action has also been noted in connection with combinations, or with preformed salts, of many other organic acidic materials and other basic materials capable of reaction therewith. Thus Buna N has been toughened on the mill by the addition thereto of basic reacting materials, such as magnesium oxide, zinc oxide or calcium hydroxide, together with organic acidic materials such as p-toluene sulfonic acid monohydrate, meta-aminobenzoic acid, sulfosalicylic acid, 2,4-dihydroxybenzoic acid, anthranilic acid, picric acid, 3,5-dinitrobenzoic acid, acetylsalicylic acid, furoic acid, phthalic acid, cinnamic acid, alpha-picolinic acid hydrochloride, 1-nitro-2-naphthol, and the like. This toughening action occurs either during the milling, or within 24 to 48 hours thereafter when the milled stock is held at room temperature; the toughened stock is found to resist further milling, and to be resistant to the disintegrating effect of solvents such as benzene.

The same general effect has been observed with films cast from solutions of Buna N polymer. The solutions were prepared by milling the reactive basic material into the polymer, dissolving the mixture in methyl ethyl ketone, and adding the organic acidic material. The solutions were applied between strips of cloth, dried, and the cloth strips pulled apart in a modified strip-back test; the strips were then soaked in benzene for 16 hours. Combinations of litharge with p-toluene sulfonic acid, cupric oxide with salicylic acid, and ferric oxide with p-toluene sulfonic acid increased the toughness and the resistance to benzene of the polymer to a remarkable degree. Cadmium, strontium, and tin salts, e. g. salicylates of these metals, have also been found to produce a desirable toughening action on Buna N polymers.

Salts of a volatile basic material and an organic acidic material, such for example as ammonium salicylate, have also been used with success; it is believed that the more volatile ammonia is at least partially displaced by the non-volatile zinc or other basic material at some stage of the process, although some toughening action has been noted with ammonium salicylate even in the absence of such non-volatile basic materials. In some cases, it has been noted that toughening is more rapid with ammonium salicylate and zinc oxide than with salicylic acid and zinc oxide particularly when tested on the mill at the somewhat elevated themperatures there encountered.

It is believed that the soluble and compatible salts, or combinations of materials capable of reacting to produce soluble and compatible salts, are most useful for the production of liquid adhesive cement compositions, since it has been observed that materials which crystallize out of such solutions or which form crystals in the final dried film have less toughening effect than those which do not thus separate.

The compositions of the following examples, wherein all proportions are given in parts by weight unless otherwise specified, have been found useful as liquid adhesive cements and coating compounds.

*Example 1*

| | |
|---|---|
| Rubbery butadiene-acrylonitrile polymer | 100 |
| Soft coumarone-indene resin | 10 |
| Salicylic acid | 10 |
| Oil-soluble phenol-aldehyde resin | 80 |
| Methyl ethyl ketone | 550 |

One possible making procedure is as follows:

Mill the polymer on a cold mill until smooth, then add the coumarone-indene resin and salicylic acid on the mill. Dissolve the milled base in the methyl ethyl ketone, then add the phenol-aldehyde resin and dissolve to a smooth uniform solution.

However, a better making procedure is: Mill the polymer on a cold mill until smooth and then work in the coumarone-indene resin on the mill. Next dissolve the milled base in the solvent, i. e. the methyl ethyl ketone. Then incorporate the salicylic acid. After this, the phenol aldehyde resin is added and dissolved to a smooth uniform solution.

The above solution remains stable at a brushable viscosity. It is found to give good "strip-back" values, e. g. of as high as 30 lbs. per inch width, whereas the formula in the absence of the salicylic acid exhibits very low strip-back values.

The strip-back value may be determined by applying a substantial coating of the liquid cement to a steel panel, pressing thereon a strip of canvas, drying the cement, and stripping the canvas from the steel by pulling it back on itself in a suitable testing machine. A Scott tensile testing machine, having a rate of jaw separation of two inches per minute, and measuring the total pull on the sample in pounds, is found to be fully satisfactory. A modified strip-back test may be substituted wherein a second strip of canvas or other equivalent strong fabric is substituted for the metal panel.

The cement of the above formula is found to adhere firmly both to metal and to fabric, e. g., to the steel panel and canvas strip used in testing; in the strip-back test, for example, failure of the cement occurs along a central plane within the cement layer itself rather than at the juncture between cement and metal or fabric. In the absence of the salicylic acid, failure occurs at a much lower strip-back value, by complete removal of the cement from the metal surface.

The soft coumarone-indene resin of this cement serves as a softener for the polymer during preliminary milling, and also as a mild tackifier in the final formula. It is readily soluble in various solvents, and hence is not a preferred material for use where solvent-resistance is an important factor. Similarly, the oil-soluble phenol-aldehyde resin is most useful as a tackifier in cements which are not required to be solvent-resistant.

If to the formula of Example 1 there be added a suitable reactive basic material such as zinc oxide, in amounts equal to from about one to about three chemical equivalents based on the organic acidic material, the cement is found to remain stably viscous, but the dried film of the modified formula is found to have greatly increased internal strength and toughness, and to be resistant to solvent and heat, after only 24–48 hours at room temperature. Where greatly increased amounts of the basic material are added, the cement in some instances may increase in viscosity; thus 100 parts of ZnO, or 50 parts of MgO, added to the formula of Example 1, would be likely to produce thickening and even gelation.

The toughening agents may be added in other ways, as indicated in the following examples, and in other proportions depending on the specific acidic and basic materials used, the formulation of the cement, the type and amount of solvent, and various other factors which will be apparent to those skilled in the art, particularly in view of the present disclosure, to produce stably viscous solutions of self-toughening cement compositions.

*Example 2*

| | |
|---|---|
| Rubbery butadiene-acrylonitrile polymer | 100 |
| Zinc oxide | 20 |
| Soft carbon black | 80 |
| Salicylic acid | 20 |
| Chlorobenzene | 670 |
| Ethyl alcohol | 40 |

Mill the zinc oxide and carbon black into the polymer as in Example 1, and dissolve in the mixed solvents; then add and dissolve the salicylic acid.

Chlorobenzene alone does not appear to be a solvent for zinc salicylate, but the combination of zinc oxide and salicylic acid in the mixed solvent and in the presence of the polymer is found to be highly effective. Reaction of the oxide and acid in situ, to form a salt, is indicated by the fact that tinned iron containers are not corroded by this formula; in the absence of the zinc oxide, or where the amount of zinc oxide or other reactive basic material is less than that required to react with all of the organic acidic material, the resulting composition has been found to cause corrosion of such containers.

The cement of Example 2 is not as effective as that of Example 1 as regards adhesion to many surfaces but when coated on fabric or the like, as by means of spreader bars, provides a well-attached coating and proofing layer which on drying firms up even at normal room temperature, or more effectively when moderately heated, for example at 150° F. for 4–5 hours or up to 200° F. for a correspondingly shorter period, to a tough, non-thermoplastic, solvent-resistant state. The resulting proofed fabric or other fibrous sheet material is useful for the construction of fuel cells, oil-proof gaskets, etc.

The addition of carbon black is advantageous, in addition to providing a desirable appearance, in increasing the resistance of the dried and toughened film to the deteriorating effects of sunlight and in improving its internal strength; other pigments or fillers may, however, be used in conjunction with or to replace part or all of the carbon.

Where desired, suitable tackifiers may be added in order to improve the adhesion of this composition.

*Example 3*

Another liquid cement coating composition which has been found particularly appropriate for the sealing of metal-to-metal joints against moderate air pressure even in the presence of oils and solvents, may be prepared as follows:

Rubbery base, to be compounded on the cold mill.
| | |
|---|---|
| Rubbery butadiene-acrylonitrile polymer | 800 |
| Tributoxy ethyl phosphate (softener) | 100 |
| Zinc oxide | 80 |

Solution (prepared, for example, in a paddle type mixer)
| | |
|---|---|
| Rubbery (milled) base | 980 |
| Tackifier resin | 560 |
| Dixie clay | 400 |
| Tributoxy ethyl phosphate | 100 |
| Short fiber asbestos (7 R grade) | 92 |
| Salicylic acid | 80 |
| Methyl isobutyl ketone | 360 |
| Methyl ethyl ketone | 1425 |

It is found convenient first to dissolve the rubbery base in the mixed solvents, and subsequently to add and dissolve the resin, additional softener, and salicylic acid; the filler materials are added last. An alternative and frequently preferred procedure involves blending the mill base, softener, and tackifier in a cold heavy-duty internal mixer, adding the solvent and fillers (asbestos and clay) with continued mixing, and lastly, with the temperature of the batch at not over 95° F., adding the salicylic acid.

Oil-soluble phenol-aldehyde resin as used in Example 1 may be used as the tackifier resin, but such resins are found to retain the solvent unduly for many uses and to provide a rather slow-drying cement composition having a tendency to form a surface skin. The dried composition is found to be somewhat less firm, solvent-resistant and heat-resistant than is desirable for many uses. A superior result is obtained by the use of a polyhydric alcohol ester of a gasoline-insoluble acidic pine wood resin produced by extracting resinous wood with a coal tar hydrocarbon, removing said hydrocarbon by evaporation, extracting the residue with a petroleum hydrocarbon, and recovering the gasoline-insoluble resin. "Vinsol Ester Gum," sold by Hercules Powder Co., is a specific example of such an esterified resin which is a superior tackifier resin for use in the present example.

One application in which this and similar cement compositions has been found particularly useful is in the sealing of metal-to-metal joints in the pressurized cabins of aircraft, where the sealer must withstand considerable pressure without being forced through the joint, even when in prolonged contact with oils or aromatic fuels or when heated to relatively high temperatures, and must also not become brittle and shake away from the seam even at extremely low temperatures. The severity of the conditions imposed upon such compositions will be better appreciated on noting that aircraft are frequently operated at cabin pressures in excess of 10 lbs. per square inch, and at outside temperatures of from −80° F. to +160° F.

For best adhesion to such smooth metal surfaces, a primer is often used with the sealer of the present example, although it is possible to obtain reasonably adequate adhesion even with this formula if the sealer be applied within a few hours after compounding.

In determining the effectiveness of the composition of Example 3 as a sealer for metal-to-metal joints, the following test has been used: A heavy aluminum panel, drilled with a ⅛ inch diameter hole, is primed on one surface with a suitable adhesive primer and after preliminary drying at room temperature is then coated with a disc of the sealer composition ⅛ inch in thickness and extending ½ inch from the hole. The coating is dried for 24 hours at 122° F., followed by 24 hours at 170° F. The sealer is then found to be capable of withstanding an air pressure of at least 10 lbs. per square inch for 30 minutes at 160° F. without allowing any leakage through the hole in the panel. In addition, it is not softened by oils or aromatic hydrocarbons, and cannot be redissolved in the ketone solvents originally used (although it may be swelled by such solvents).

In the absence of salicylic acid or equivalent organic acidic material, such a compound is found to "blow through," i. e. the portion overlying the opening in the panel is incapable of withstanding the applied air pressure, when tested under the enumerated or even less drastic conditions, and is also considerably softened by oils or aromatic hydrocarbons, and dissolved or at least swelled and disintegrated by volatile ketones.

As a specific primer for use in the above test, there may be employed the following composition:

| | Lbs. |
|---|---|
| Methyl ethyl ketone-soluble, benzene-insoluble, heat-reactive phenolic resinous reaction product from the reaction of one mol of phenol, one-half mol of acetaldehyde, and at least one-half mol of formaldehyde (e. g. "Durez" #175) | 130 |
| Rubbery 60:40 butadiene-acrylonitrile polymer | 100 |
| Methyl isobutyl ketone | 450 |

Such a primer composition applied to the aluminum test panel in a thin film and allowed to dry at room temperature produces a firmly adherent bond between said panel and the subsequently applied sealer composition of Example 3.

*Example 4*

When to the primer composition described above in connection with Example 3 there is added an amount of magnesium salicylate equivalent to 10 parts of salicylic acid per 100 parts of rubbery polymer it is found that the resulting composition is stably viscous, and is capable of forming dried films which are self-toughening and which rapidly become highly solvent-resistant and of high softening point.

Example 5

| | |
|---|---|
| Rubbery butadiene-acrylonitrile polymer | 100 |
| Zinc oxide | 10 |
| Esterified gasoline-insoluble pine wood resin as in Example 3 | 50 |
| Oil-soluble heat-reactive phenol-aldehyde resin | 50 |
| Salicylic acid | 15 |
| Acetone | to 30% total solids |

The composition of this example has superior adhesion to various synthetic rubbery polymers including neoprene, Buna S, and Buna N type polymers by virtue of the presence of the oil-soluble phenol-aldehyde resins. Since the resin is also heat-reactive, however, and sets up on moderate heating, I have found that dried films of this composition are readily rendered completely oil-resistant. The presence of the phenolic resin also increases the heat resistance of dried and heated films of the cement. Even without heating, however, the combination of zinc oxide and salicylic acid, together with the other ingredients yields a self-toughening composition which rapidly becomes heat-resistant and oil-resistant. A typical oil-soluble heat-reactive phenol-aldehyde resin suitable for use in the above formula may be made by reacting one mol of a substituted phenol having only two reactive positions, such as p-t-amyl phenol or p-phenyl phenol, with more than one, and preferably about two, mols of formaldehyde, in the presence of an alkaline catalyst, to a point at which the cold resin is solid but still heat-hardening.

It is found that the composition of Example 5 is of particular value in cementing together materials containing oils or plasticizers, as for example in cementing sheets or strips of plasticized vinyl polymers to leather, or fabric to leather, in the construction of shoes and the like. A firm adherent bond is obtained which is not softened by the plasticizer of the vinyl polymer or the oils of the leather.

Example 6

| | |
|---|---|
| Mill base rubbery butadiene-acrylonitrile polymer | 100 |
| Zinc oxide | 10 |
| Soft carbon black | 10 |
| Solution: | |
| Mill base _____ lbs | 600 |
| Organic acidic material | 75 |
| Esterified gasoline-insoluble pine wood resin (see under Example 3) | 250 |
| Oil-soluble heat-reactive phenol-aldehyde resin (see under Example 5) | 125 |
| Methyl ethyl ketone _____ gal | 105 |
| Acetone _____ gal | 115 |

Three different modifications of the above example prepared with three different organic acidic materials were compared with a similar formula in which no such acidic material was used, by means of a "dead weight strip-back" test. In this test canvas was bonded to canvas by the cement, one strip of the canvas being pulled back at an 180° angle and being placed under constant tension rather than being pulled apart at a constant rate. The test panel was held in an oven in a vertical position, and a weight of 500 grams was suspended from the turned back upper edge of the 2-inch width strip of fabric; the temperature of the oven was increased 20° F. every 15 minutes, and the length of strip removed from the panel at the expiration of each constant-temperature period was determined. Starting at a temperature of 160° F. the following results were obtained:

*Dead Weight Strip-back Test, 250 gms. per inch*

| | 180° F. | 220° F. | 260° F. |
|---|---|---|---|
| | Inches | Inches | Inches |
| Without acid | 1⅞ | | |
| 15% Salicylic Acid | ¼ | 2¾ 0 | |
| Orthochloro-benzoic acid | ½ | 2 | |
| Orthoamino-benzoic acid | ⅛ | ¾ 0 | ¾ 0 |

In the above table where no values have been entered the strips had been completely removed at or before the temperature indicated.

Similar test cases were found to have high strip-back value even after aging at normal room temperatures and were also found to be substantially non-thermoplastic and to have good resistance to oil and to aromatic hydrocarbons. The cements of this example were found to be capable of providing a firmly adherent bond to such difficultly bonded material as waterproofed and flame-proofed canvas which had been treated with such materials as chlorinated paraffin.

Where rubbery butadiene-acrylonitrile polymers have been specified in the above example it will be understood that similar polymers of other homologous monomers, and likewise polymers of monomers including small amounts of still other polymerizable constituents, may be employed. All such polymers are intended to be included under the generic term "Buna N type polymer." In general, however, for the purposes of this invention, I prefer to employ the rubbery polymers obtained by the polymerization, by methods well known to the art, of butadiene and acrylonitrile, and in proportions of about 50:50 to about 85:15, respectively. It will be understood that selection of the most desirable polymer for a specific formula may depend on the method of preparation and the methods and extent of subsequent treatment of the polymer as well as on the relative proportions of the respective monomers employed.

To demonstrate the differences sometimes obtained between polymers having substantially the same proportions of monomers, two commercially available Buna N type polymers were milled, dissolved, treated with salicylic acid, and the dried product tested for toughness and heat-resistance by means of a dead-weight strip-back test. "Hycar OR–15," a 60:40 polymer, was not appreciably toughened, although in the presence of even small amounts of zinc oxide a considerable toughening effect was obtained with this polymer. "Chemigum N–1," a 70:30 polymer, on the other hand, was found to increase in both toughness and heat-resistance as shown by the following results:

| Cementing Material | separation at 250 grams/inch width, inches | |
|---|---|---|
| "Chemigum N–1" | 150° F., 4¾ inch | 180° F., failure. |
| With salicylic acid 15% | 150° F., ⅛ inch | 270° F., ⅛ inch. |

Various solvents and solvent mixtures have been disclosed in connection with the above examples. The particular solvents or mixtures therein disclosed are effective solvents for the Buna N type polymer, and also appear to promote, or at least to permit, the salt-forming reaction and to dissolve the salicylate or other salt thus formed. In addition, they are highly volatile at normal room temperature and are therefore useful in cement compositions which depend on evaporation of the solvent for their final utility. Certain organic esters, nitroparaffins, alcohols, and the like have also been found to come within these limitations and may therefore be used as volatile solvents for my adhesive cement compositions.

While in general it has been found desirable to utilize from about 10 to about 20 parts of organic acidic material to 100 parts of rubbery butadiene-acrylonitrile polymer, as shown in the foregoing specific examples, it is to be understood that other concentrations are also of value and are to be considered as coming within the scope of my invention. Thus, up to 50 parts of salicylic acid have in some cases been employed, and also as low as 5 parts, with the production of useful compositions. However, for best results in providing economical yet efficient self-toughening cement compositions in liquid form, I prefer to use the proportions of the order indicated in the examples. Also, as previously indicated, I prefer to use at least a slight excess of reactive basic material over the stoichiometric amount required by the acid, but not such excess as to cause gelation or undue viscosity increase of the cement solution.

Cement compositions prepared according to my invention have been shown to be particularly useful in sealing metal-to-metal joints, in adhering plasticized or softener-containing materials to themselves or to other objects, in coating fabrics, and the like, where their usefulness is largely due to their property of self-toughening, on removal of solvent and without application of heat, to a more coherent, tougher, and solvent resistant state having reduced thermoplasticity. Another use for these cements involves their property of increased weather-resistance; thus, abrasive grit or other suitable particulate material may be mixed with the cement and applied to a floor surface to provide a self-curing oil-resistant and weather-resistant anti-slip coating.

This same property of weather-resistance appears to be obtained when the polymer is treated with the organic acidic material alone; a strip of Buna N type rubbery polymer compounded with 5 to 10 percent of its weight of salicylic acid, for example, has been found to be much more resistant to cracking and checking when exposed under tension to strong sunlight than is the polymer itself.

While my invention has been described and illustrated herein in various details and with specific materials and examples, it will be understood that it is not to be limited thereby and that all equivalents and variations, novel over the prior art, which come within the scope of my invention are likewise comprehended.

What I claim is:

1. A new composition of matter in stably viscous liquid form which, on evaporation of volatile solvent therefrom, is self-toughening at ordinary room temperature to an oil-resistant, substantially non-thermoplastic state, said composition comprising a volatile solvent, a thermoplastic base including 100 parts of rubbery butadiene-acrylonitrile polymer, and, as a toughening agent, the zinc salt of salicylic acid in an amount equivalent to about 10–20 parts of salicylic acid.

2. A new composition of matter in stably viscous liquid form which, on evaporation of volatile solvent therefrom, is self-toughening at ordinary room temperature to an oil-resistant, substantially non-thermoplastic state, said composition comprising a volatile solvent, a thermoplastic base including 100 parts of rubbery butadiene-acrylonitrile polymer, and, as a toughening agent, a bivalent metal salt of a hydroxy benzoic acid in an amount equivalent to about 10–20 parts of said acid.

3. A new composition of matter in stably viscous liquid form which, on evaporation of volatile solvent therefrom, is self-toughening at ordinary room temperature to an oil-resistant, substantially non-thermoplastic state, said composition comprising a volatile solvent, a thermoplastic base including 100 parts of rubbery butadiene-acrylonitrile polymer, and a toughening agent soluble in said volatile solvent and comprising a bivalent metal salt of an aromatic carboxylic acid, said toughening agent being present in an amount equivalent to about 10–20 parts of said acid.

4. A stably viscous liquid adhesive cement composition comprising a solution in a volatile solvent of a thermoplastic blend comprising 100 parts of a rubbery butadiene-acrylonitrile polymer, a tackifier, and about 10–20 parts of salicylic acid.

5. A new composition of matter in a stably viscous liquid form, capable of forming a firmly adherent, oil-resistant, substantially non-thermoplastic coating on a supporting surface on brief ageing of a pre-dried coating of said liquid composition at temperatures of not more than about 120° F., said composition comprising a volatile solvent, a thermoplastic base including 100 parts of rubbery butadiene-acrylonitrile polymer and a resinous tackifier therefor comprising an oil-soluble heat-advancing phenol-aldehyde resin, and, as a toughening agent, a bivalent metal salt of an aromatic carboxylic acid in an amount equivalent to about 10–20 parts of said acid, said salt being soluble in said volatile solvent.

6. A new composition of matter in stably viscous liquid form, capable of forming a firmly adherent, oil-resistant, substantially non-thermoplastic coating on a supporting surface on brief ageing of a pre-dried coating of said liquid composition at temperatures of not more than about 120° F., said composition comprising a volatile solvent, a thermoplastic base including 100 parts of rubbery butadiene-acrylonitrile polymer and a resinous tackifier therefor comprising an oil-soluble heat-advancing phenol-aldehyde resin, and, as a toughening agent, zinc salicylate in an amount equivalent to about 10–20 parts of salicylic acid.

7. A new composition of matter in stably viscous liquid form, capable of forming a firmly adherent, oil-resistant, substantially non-thermoplastic coating on a supporting surface on brief aging of a pre-dried coating of said liquid composition at temperatures of not more than about 120° F., said composition comprising a volatile solvent, a thermoplastic base including a rubbery butadiene-acrylonitrile polymer and a resin tackifier therefor, said resin being solid at room temperatures and being present to the extent of about 50 to about 130 parts by weight thereof per 100 parts of said polymer, and a toughening agent soluble in said volatile solvent and comprising a bivalent metal salt of an aromatic monocarboxylic acid, said toughening agent being present in an amount equivalent to about 10–20 parts of the said acid per 100 parts of said polymer.

8. A new composition of matter in stably viscous liquid form, capable of forming a firmly adherent, oil-resistant, substantially non-thermoplastic coating on a supporting surface on brief aging of a pre-dried coating of said liquid composition at temperatures of not more than about 120° F., said composition comprising a volatile solvent, a thermoplastic base including a rubbery butadiene-acrylonitrile polymer and a resin tackifier therefor solid at room temperatures and comprising an oil-soluble heat-advancing phenol-aldehyde resin and being present to the extent of about 50 to about 130 parts by weight thereof per 100 parts of said polymer, and a toughening agent soluble in said volatile solvent and comprising a bivalent metal salt of an aromatic monocarboxylic acid, said toughening agent being present in an amount equivalent to about 10–20 parts of the said acid per 100 parts of said polymer.

9. A structure including a porous sheet material and a coating thereon of a tough, oil-resistant, heat-resistant, dried and self-toughened coating composition comprising 100 parts of rubbery butadiene-acrylonitrile polymer and a toughening agent comprising a bivalent metal salt of an aromatic carboxylic acid, said toughening agent being present in an amount equivalent to about 10–20 parts of said acid.

10. In a composite structure, a member having a surface and, firmly adherently bonded thereto, a coating comprising the dried and toughened layer of an adhesive cement composition comprising a thermoplastic base including 100 parts of rubbery butadiene-acrylonitrile polymer and about 50–130 parts of tackifier resin solid at room temperatures, and a toughening agent comprising a bivalent metal salt of an aromatic monocarboxylic acid, said toughening agent being present in an amount equivalent to about 10–20 parts of said acid.

ALFRED L. FINN.

REFERENCES CITED

The following references are of record in the file of this patent:

UNITED STATES PATENTS

| Number | Name | Date |
| --- | --- | --- |
| 1,386,791 | Murdock | Aug. 9, 1921 |
| 1,919,718 | Gray | July 25, 1933 |
| 1,931,922 | Damsel et al. | Oct. 24, 1933 |
| 2,310,449 | Lightbown et al. | Feb. 9, 1943 |
| 2,325,981 | Sarbach | Aug. 3, 1943 |
| 2,331,097 | Watter | Oct. 5, 1943 |
| 2,379,552 | Teppema et al. | July 3, 1945 |
| 2,389,641 | Sarbach | Nov. 27, 1945 |
| 2,396,967 | Phillips | Mar. 19, 1946 |
| 2,403,200 | Weiss | July 2, 1946 |

OTHER REFERENCES

Wildschut, A. P. C., Ser. No. 357,662, Pub. April 20, 1943.

Sarbach: pages 363–367; India Rubber World, July 1943.

"Hycar Synthetic Rubber Blue Book," published by Goodrich Chemical Co., Cleveland, Ohio; Sec. 3, Group D, pages 1 and 2, October 15, 1943. (Copy in Div. 67.)